United States Patent
Ekpenyong et al.

(10) Patent No.: US 12,425,147 B2
(45) Date of Patent: *Sep. 23, 2025

(54) METHODS AND APPARATUS FOR DUAL CONNECTIVITY OPERATION IN A WIRELESS COMMUNICATION NETWORK

(71) Applicant: TEXAS INSTRUMENTS INCORPORATED, Dallas, TX (US)

(72) Inventors: Anthony E. Ekpenyong, Houston, TX (US); Ralf M. Bendlin, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 384 days.

This patent is subject to a terminal disclaimer.

(21) Appl. No.: 17/805,791

(22) Filed: Jun. 7, 2022

(65) Prior Publication Data
US 2022/0303082 A1  Sep. 22, 2022

Related U.S. Application Data

(63) Continuation of application No. 14/152,675, filed on Jan. 10, 2014, now Pat. No. 11,356,216.

(60) Provisional application No. 61/750,904, filed on Jan. 10, 2013.

(51) Int. Cl.
*H04L 5/00* (2006.01)
(52) U.S. Cl.
CPC .......... *H04L 5/0035* (2013.01); *H04L 5/0094* (2013.01); *H04L 5/001* (2013.01); *H04L 5/0055* (2013.01); *H04L 5/0057* (2013.01)

(58) Field of Classification Search
CPC ..... H04L 5/0035; H04L 5/0094; H04L 5/001; H04L 5/0055; H04L 5/0057
See application file for complete search history.

(56) References Cited

U.S. PATENT DOCUMENTS

| | | | |
|---|---|---|---|
| 11,356,216 B2* | 6/2022 | Ekpenyong | H04L 5/0035 |
| 2008/0070586 A1* | 3/2008 | Kermoal | H04W 16/04 455/452.2 |
| 2008/0188219 A1 | 8/2008 | Fischer | |
| 2009/0197630 A1 | 8/2009 | Ahn et al. | |
| 2009/0203384 A1* | 8/2009 | Vujcic | H04W 74/08 455/450 |
| 2009/0232095 A1* | 9/2009 | Ahn | H04W 74/006 370/331 |
| 2010/0080137 A1 | 4/2010 | Vedantham et al. | |

(Continued)

OTHER PUBLICATIONS

U.S. Patent Prosecution History, U.S. Appl. No. 14/152,675, filed Jan. 10, 2014, 703 pages.

(Continued)

*Primary Examiner* — Jael M Ulysse
(74) *Attorney, Agent, or Firm* — Zhenhai Fu; Frank D. Cimino

(57) ABSTRACT

Dual-connectivity for the User Equipment (UE) in a cellular network is performed by monitoring a plurality of cells. During dual-connectivity, the UE may be simultaneously connected to one serving cell for the Control Plane (C-plane) and to another serving cell, controlled by a different eNodeB, for the User Plane (U-plane). In another embodiment, the dual-connected UE monitors a Physical Downlink Control Channel (PDCCH) from the first eNB and monitors an EPDCCH from the second eNB.

15 Claims, 5 Drawing Sheets

(56) References Cited

U.S. PATENT DOCUMENTS

| | | | |
|---|---|---|---|
| 2010/0240367 A1* | 9/2010 | Lee | H04W 36/142 455/435.2 |
| 2010/0255844 A1 | 10/2010 | Fischer et al. | |
| 2011/0032889 A1* | 2/2011 | Lee | H04W 74/006 370/329 |
| 2011/0051685 A1* | 3/2011 | Saitou | H04W 36/02 370/331 |
| 2011/0075629 A1 | 3/2011 | Seo et al. | |
| 2011/0076962 A1* | 3/2011 | Chen | H04L 5/001 455/68 |
| 2011/0081912 A1 | 4/2011 | Fischer et al. | |
| 2011/0141971 A1 | 6/2011 | Zhang et al. | |
| 2011/0170495 A1 | 7/2011 | Earnshaw et al. | |
| 2011/0249642 A1 | 10/2011 | Song et al. | |
| 2011/0261777 A1 | 10/2011 | Maeda et al. | |
| 2011/0280223 A1 | 11/2011 | Maeda et al. | |
| 2011/0300872 A1 | 12/2011 | Lim et al. | |
| 2012/0008575 A1* | 1/2012 | Vujcic | H04W 74/002 370/344 |
| 2012/0044882 A1 | 2/2012 | Kim et al. | |
| 2012/0057535 A1* | 3/2012 | Zhang | H04W 72/27 370/329 |
| 2012/0057544 A1 | 3/2012 | Xu et al. | |
| 2012/0088533 A1 | 4/2012 | Khoshnevis et al. | |
| 2012/0147830 A1 | 6/2012 | Lohr et al. | |
| 2012/0188953 A1 | 7/2012 | Won et al. | |
| 2012/0224552 A1 | 9/2012 | Feuersanger et al. | |
| 2012/0257513 A1* | 10/2012 | Yamada | H04W 76/40 370/328 |
| 2012/0281566 A1 | 11/2012 | Pelletier et al. | |
| 2012/0294694 A1 | 11/2012 | Garot | |
| 2012/0300686 A1 | 11/2012 | Maeda et al. | |
| 2012/0314652 A1* | 12/2012 | Ahn | H04W 56/0045 370/328 |
| 2012/0320805 A1* | 12/2012 | Yang | H04L 5/0053 370/280 |
| 2013/0003668 A1* | 1/2013 | Xiao | H04L 5/0098 370/329 |
| 2013/0010619 A1 | 1/2013 | Fong et al. | |
| 2013/0016659 A1* | 1/2013 | Kone | H04W 36/0027 370/328 |
| 2013/0021996 A1* | 1/2013 | Wang | H04L 5/0073 370/329 |
| 2013/0044708 A1 | 2/2013 | Kim et al. | |
| 2013/0058234 A1 | 3/2013 | Yang et al. | |
| 2013/0065585 A1* | 3/2013 | Pelletier | H04L 67/55 455/456.6 |
| 2013/0114517 A1* | 5/2013 | Blankenship | H04L 5/0094 370/329 |
| 2013/0155891 A1 | 6/2013 | Dinan | |
| 2013/0163532 A1* | 6/2013 | Anderson | H04L 5/0053 370/329 |
| 2013/0163533 A1* | 6/2013 | Anderson | H04W 1/1812 370/329 |
| 2013/0182649 A1* | 7/2013 | Kwon | H04L 5/001 370/328 |
| 2013/0201841 A1* | 8/2013 | Zhang | H04W 72/04 370/252 |
| 2013/0242730 A1* | 9/2013 | Pelletier | H04L 5/0053 370/230 |
| 2013/0242881 A1 | 9/2013 | Wang et al. | |
| 2013/0258868 A1 | 10/2013 | Davis | |
| 2013/0272279 A1* | 10/2013 | Dinan | H04W 28/18 370/336 |
| 2013/0310037 A1 | 11/2013 | Ji et al. | |
| 2013/0315157 A1* | 11/2013 | Krishnamurthy | H04L 5/0073 370/329 |
| 2013/0324124 A1* | 12/2013 | Scribano | H04W 48/18 455/435.3 |
| 2014/0036822 A1* | 2/2014 | Maeda | H04B 17/327 370/329 |
| 2014/0056278 A1* | 2/2014 | Marinier | H04W 52/367 370/330 |
| 2014/0092865 A1* | 4/2014 | Heo | H04L 1/1861 370/331 |
| 2014/0219204 A1* | 8/2014 | Park | H04L 1/1822 370/329 |
| 2015/0016419 A1* | 1/2015 | Kim | H04W 24/08 370/331 |
| 2015/0029886 A1* | 1/2015 | Seo | H04L 27/2602 370/252 |
| 2015/0043369 A1* | 2/2015 | Kim | H04W 24/08 370/252 |
| 2015/0063095 A1* | 3/2015 | Deng | H04W 8/005 370/221 |
| 2015/0333893 A1* | 11/2015 | Lee | H04B 7/0486 370/252 |

OTHER PUBLICATIONS

U.S. Provisional Prosecution History, U.S. Appl. No. 61/707,784, filed Sep. 28, 2012, 343 pages.

* cited by examiner

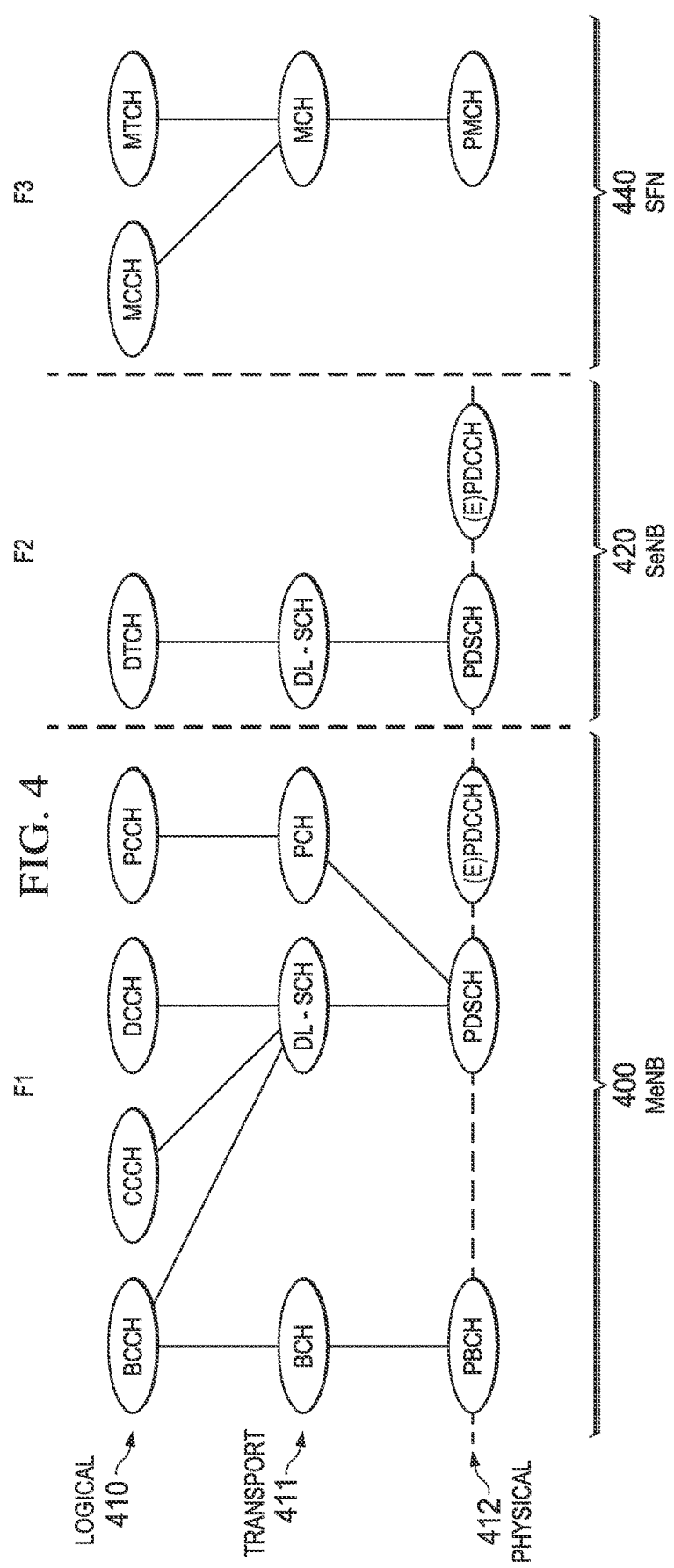

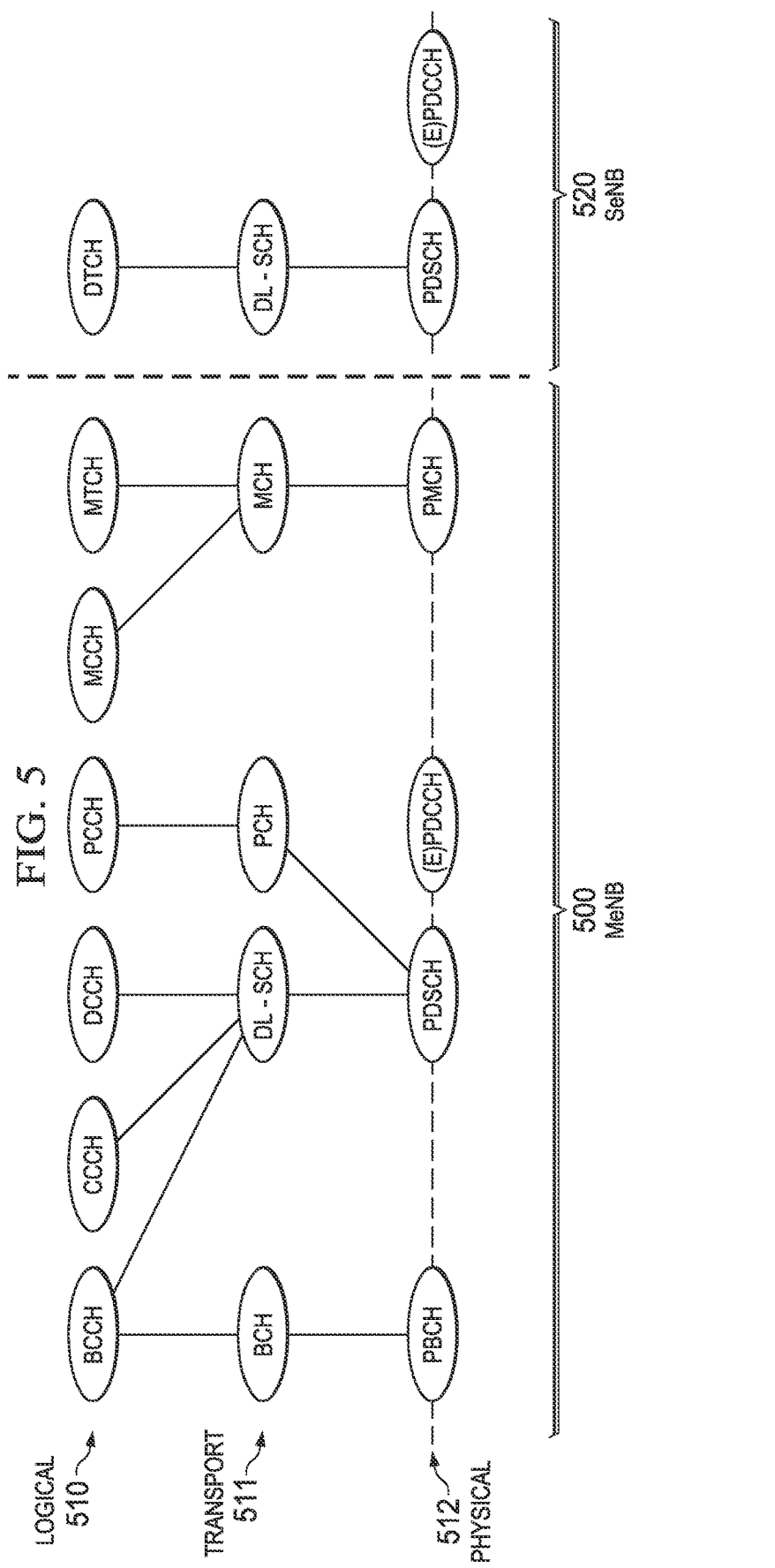

METHODS AND APPARATUS FOR DUAL CONNECTIVITY OPERATION IN A WIRELESS COMMUNICATION NETWORK

This application is a continuation of U.S. patent application Ser. No. 14/152,675 filed Jan. 10, 2014, which claims the benefit of U.S. provisional application No. 61/750,904 filed on Jan. 10, 2013, entitled "Physical layer signaling mechanisms for Dual-Connectivity in LTE-Advanced," the entire content of the above-mentioned applications being incorporated herein by reference.

FIELD OF THE INVENTION

This invention generally relates to wireless cellular communication, and in particular to User Equipment simultaneously connected to at least two serving cells controlled by different base stations.

BACKGROUND OF THE INVENTION

Wireless cellular communication networks incorporate a number of wireless terminal devices and a number of base stations for the purpose of providing communications services such as telephony, data, video, messaging, chat and broadcast. A number of wireless terminals can be connected to a serving cell that is controlled by a base station (BS). Typical access schemes employed in widely used cellular networks include Frequency Division Multiple Access (FDMA), Time Division Multiple Access (TDMA), Code Division Multiple Access (CDMA), Orthogonal Frequency Division Multiple Access (OFDMA), Single-Carrier Frequency Division Multiple Access (SC-FDMA) or combinations thereof. The base station (BS) may also be called a NodeB in the Universal Mobile Telecommunications System (UMTS) specified by the Third Generation Partnership Project (3GPP), a base transceiver system (BTS), an access point (AP), or some other equivalent terminology. As improvements of networks are made, the NodeB functionality evolves, so a NodeB is also referred to as an evolved NodeB (eNodeB or eNB) in the 3GPP Long Term Evolution (LTE) system. In general, eNodeB hardware, when deployed, is fixed and stationary.

In contrast to the eNodeB, the wireless terminal devices can be portable hardware. The wireless terminal device is commonly referred to as a User Equipment (UE), a mobile station, a cellular phone, a personal digital assistant (PDA), a wireless modem card, and so on. Uplink (UL) communication refers to communication from a fixed or mobile UE to the eNodeB, whereas downlink (DL) communication refers to communication from the eNodeB to the fixed or mobile UE. Each eNodeB contains radio frequency transmitter(s) and receiver(s) used to communicate directly with the mobiles, which move either freely around it or are also at a fixed location. Similarly, each UE contains radio frequency transmitter(s) and receiver(s) used to communicate directly with the eNodeB.

Long Term Evolution (LTE) wireless networks, also known as Evolved Universal Terrestrial Radio Access Networks (E-UTRAN), are being standardized by the 3GPP working groups (WGs). OFDMA and SC-FDMA access schemes are employed for the downlink (DL) and uplink (UL) of E-UTRAN, respectively as part of the Evolved Universal Terrestrial Radio Access (E-UTRA). User Equipments (UEs) are time, frequency or code multiplexed on a physical uplink shared channel (PUSCH) for transmitting Uplink Shared Channel (UL-SCH) data, and a fine time and frequency synchronization between UEs guarantees optimal intra-cell orthogonality. In case the UE is not UL synchronized, it may initiate the random access procedure for synchronization by transmitting a random access preamble on the Physical Random Access Channel (PRACH). The base station provides back some allocated UL resource and timing advance information to allow the UE to transmit on the PUSCH. Downlink control-plane and user-plane data are scheduled by the Physical Downlink Control Channel (PDCCH) or the Enhanced Physical Downlink Control Channel (EPDCCH) and the actual data is transmitted on the Physical Downlink Shared Channel (PDSCH). The general operations of the physical channels are described in the EUTRA specifications, for example: "$3^{rd}$ Generation Partnership Project; Technical Specification Group Radio Access Network; Evolved Universal Terrestrial Radio Access (E-UTRA); Physical Channels and Modulation (TS 36.211 Release 8 or later)."

The explosion in data traffic in current cellular networks has motivated the need for a rapid expansion of network capacity to cope with this demand. In addition, it has been observed that the majority of data/video traffic occurs in hotspot and indoor scenarios, where data-hungry smartphone applications overwhelm existing networks. As a result, a major initiative in LTE-Advanced commenced in the LTE Release 10 standard with the introduction of a heterogeneous network (HetNet) architecture consisting of small cells, controlled by low power eNodeB nodes, in addition to macro cells controlled by high power eNodeB nodes. These low power nodes are deployed in traffic hot spots and outdoor/indoor locations to boost capacity and/or improve coverage in areas with spotty macro coverage. Several features have been introduced in LTE Releases 10 and 11 to support efficient HetNet operation with a sparse deployment of small cells including enhanced inter-cell interference coordination (e-ICIC), cooperative multipoint (CoMP) transmission/reception and carrier aggregation (CA).

Unfortunately, proposed HetNet solutions fail to take into account a denser deployment of indoor/outdoor small cells with/without macro coverage. For example, ten or more small cells may be deployed within the coverage area of a single macro cell. But proposed HetNet solutions fail to teach local area enhancements that increase spectral efficiency, and improve overall radio resource management including minimizing signaling overhead between the Radio Access Network (RAN) and the Core Network. More specifically, what is missing is any teaching for dual connectivity, wherein a User Equipment (UE) is simultaneously connected to at least two serving cells controlled by different eNodeBs. Aspects of this disclosure describe physical layer signaling mechanisms to enable dual connectivity in a wireless cellular system.

BRIEF DESCRIPTION OF THE DRAWINGS

Particular embodiments in accordance with the invention will now be described, by way of example only, and with reference to the accompanying drawings:

FIG. 4 illustrates the mapping of logical, transport and physical channels for control/user plane to Master and Secondary eNBs using different frequencies;

FIG. 5 illustrates the mapping of logical, transport and physical channels for control/user plane to Master and Secondary eNBs on the same carrier frequency;

DETAILED DESCRIPTION OF EMBODIMENTS OF THE INVENTION

Figure 1:
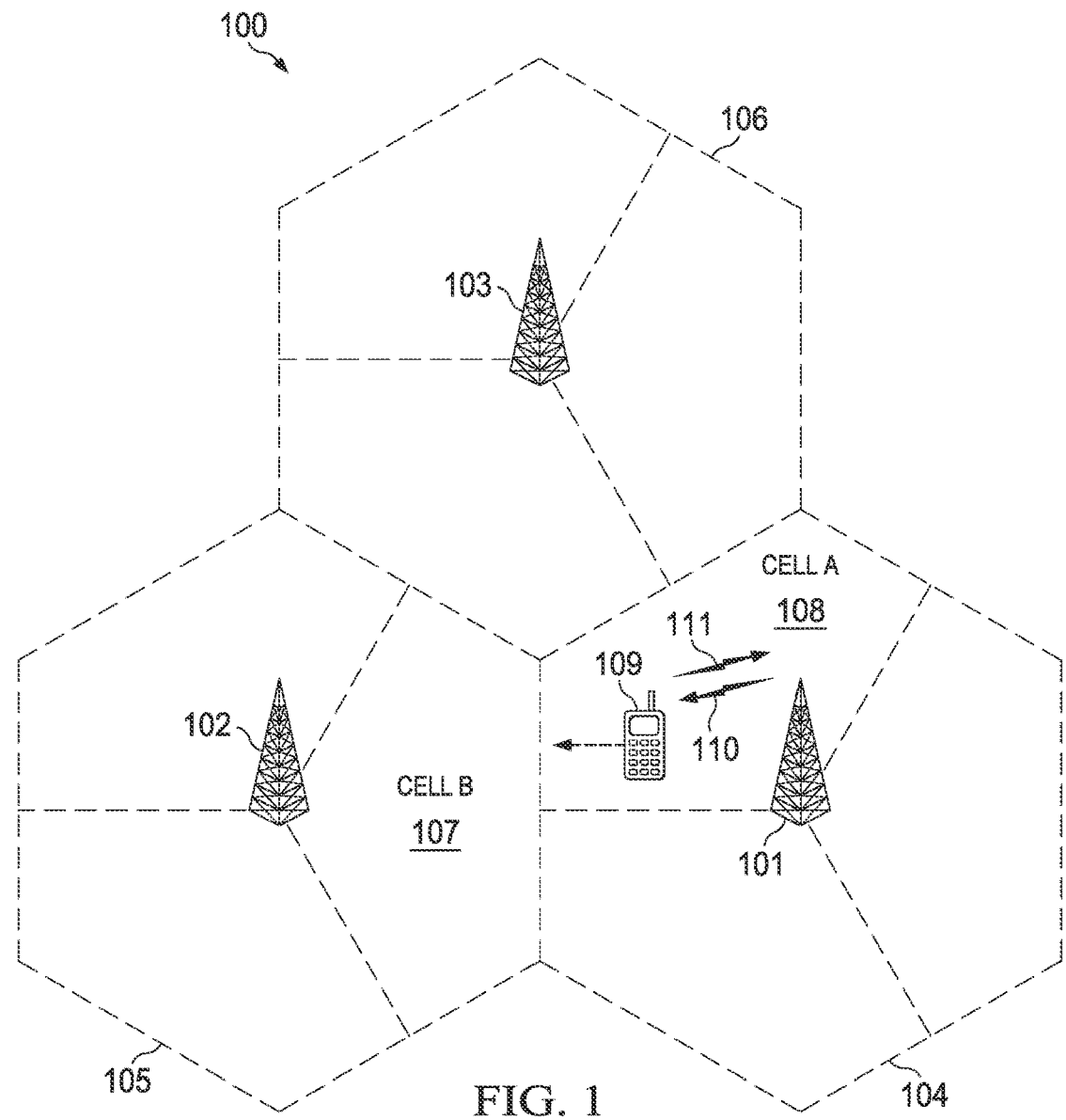
FIG. 1 is a pictorial description of a traditional homogenous network deployment of 3 macro cell sites each consisting of three sectors.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 (eNB) are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of uplink 111 time or frequency or code resources. If UE 109 has data ready for transmission, which may be traffic data, measurements report, tracking area update, UE 109 can transmit a random access signal on uplink 111. The random access signal notifies base station 101 that UE 109 requires uplink resources to transmit the UEs data. Base station 101 responds by transmitting to UE 109 via downlink (DL) 110, a message containing the parameters of the resources allocated for UE 109 uplink transmission along with a possible timing error correction. After receiving the resource allocation and a possible timing advance message transmitted on downlink (DL) 110 by base station 101, UE 109 optionally adjusts its transmit timing and transmits the data on uplink 111 employing the allotted resources during the prescribed time interval.

Base station 101 configures UE 109 for periodic uplink sounding reference signal (SRS) transmission. Base station 101 estimates uplink channel quality information (CSI) from the SRS transmission.

Figure 2:
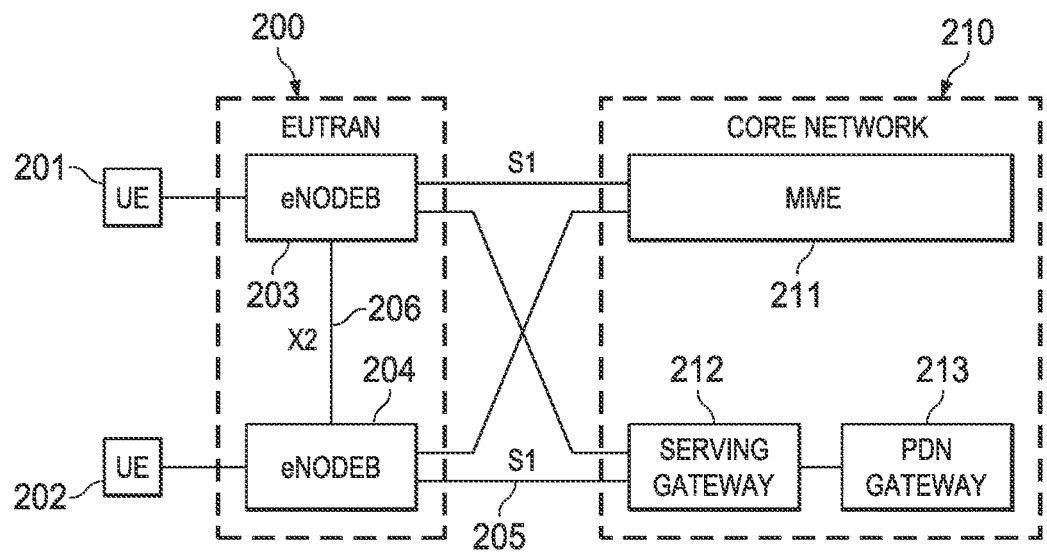
FIG. 2 is a description of the relationship between the EUTRAN and the Core Network of a LTE network.

FIG. 2 shows the relation between the EUTRAN of FIG. 1 and the core network 210 in a LTE wireless network. The eNodeBs 203 and 204 communicate with the Mobility Management Entity (MME) 211 and the Serving Gateway 212 via the S1 signaling interface 205. The UEs 201 and 202 communicate over the air interface with eNodeBs 203 and 204 respectively. Two eNodeBs are shown in this illustration but there may be more eNodeBs connected to the same MME in a deployed network. The eNodeBs communicate with each other over the X2 interface 206.

In LTE Release 11, one approach to base station cooperation in HetNets is CoMP, wherein a set of transmission points (TPs), for instance, consisting of a macro eNodeB and one or more pico eNodeBs or remote radio heads, cooperatively transmit or receive data to/from a UE within a geographical area. For the downlink, some specific CoMP schemes include joint transmission from a set of transmission points, dynamic point selection, dynamic point blanking, and cooperative beamforming/cooperative scheduling. For the uplink, semi-static point selection is introduced through the UE-specific configuration of virtual cell IDs for PUSCH/PUCCH transmission. CoMP can operate in both single carrier and aggregated carrier scenarios. Coordination between eNodeBs is enabled by signaling over a backhaul communication link. For the present LTE specifications the X2 interface specifies the signaling protocol between eNodeBs.

There are a few inherent limitations of Release 11 HetNet operation when applied to a dense small cell deployment. First, a key assumption of the LTE Release 11 CoMP operation is that message exchange between transmission points is optimized for ideal backhaul, where ideal means that the backhaul is characterized by very low latency (on the order of a few milliseconds or less) and very high throughput. Therefore, operation in non-ideal backhaul scenarios may reduce the gains shown by CoMP. Second, mobility between cells is more critical in dense networks than in more traditional homogeneous deployments because additional cells introduce new cell boundaries with much closer proximity compared to sparse or homogeneous deployments. For instance, in a dense outdoor deployment, there may be frequent handovers as a UE traverses multiple cell boundaries within a macro cell area. Therefore, it is desirable to minimize the transfer of UE context due to such frequent handovers between cells controlled by different eNodeBs and also to minimize the associated signaling between the RAN and the core network.

Figure 3:
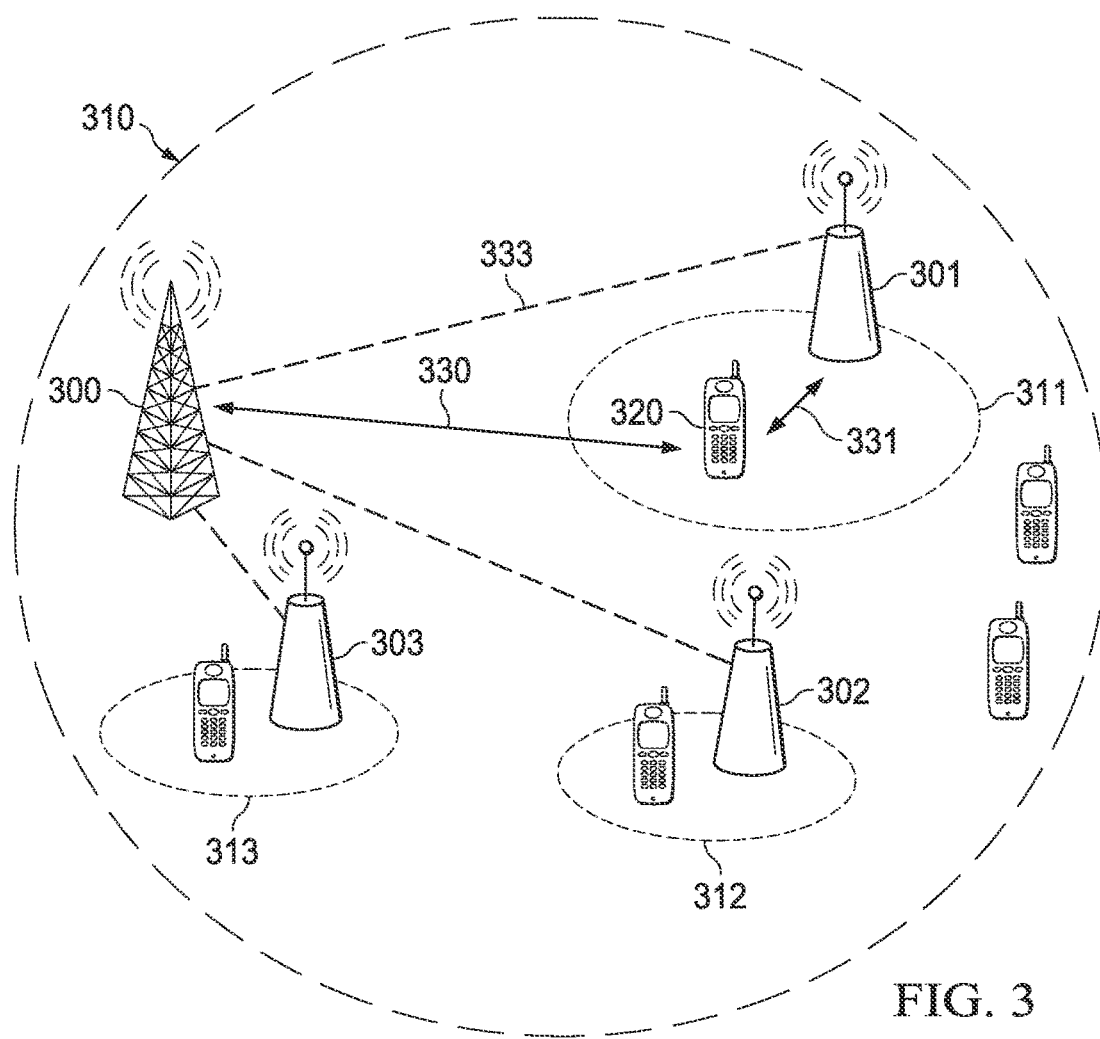
FIG. 3 is a pictorial of a heterogeneous network deployment with several small cells deployed within the coverage area of a macro cell.

One way to address these limitations and improve operational efficiency in HetNets is to introduce dual connectivity operation between a UE and two or more eNodeBs. FIG. 3 shows an exemplary dual connectivity operation where eNodeB 300 controls a macro cell 301 and a small cell layer is deployed within the coverage of macro cell 301, consisting of small cells 311, 312 and 313 controlled respectively by eNodeBs 301, 302 and 303. The eNodeBs 301, 302 and 303 are lower power eNodeBs compared to 300 and may be pico or femto eNodeBs. The macro cell 310 (or equivalently the eNodeB 300) may provide Control Plane (C-plane) functions over link 330 in the access stratum and non-access stratum and it also provide a mobility anchor for the UE 320 towards the core network. On the other hand, the small cell layer is optimized for the User Plane (U-plane) and eNodeB 310 offers high throughput and energy efficient transmissions to UE 320 on link 331. These RAN layers may operate on separate carriers (F1, F2) or on a shared carrier frequency (co-channel deployment). The eNodeBs involved in dual connectivity are assumed to be connected by a non-ideal backhaul link 333, which is characterized by limited capacity and/or significant latency up to tens of milliseconds.

This split of C-plane and U-plane between different network layers or RAN nodes improves handover efficiency by minimizing frequent transfers of UE context between eNodeBs within the coverage area of the eNodeB providing the mobility anchor to the core network.

A more general definition of dual connectivity is the operation where a UE consumes radio resources provided by at least two different eNodeBs connected by a latency- and capacity-constrained backhaul link. The primary cell is controlled by a Master eNodeB (MeNB) whereas the secondary cell(s) is controlled by a Secondary eNodeB(s)

(SeNB). In the case of coordination between macro and small cell layers of a HetNet, the MeNB is a macro eNB and the SeNB(s) is a lower power eNB(s) controlling a small cell. However, the methods described in embodiments of this invention are more general and cover the case where both eNodeBs are in the same power class. Specifically both MeNB and SeNB can be macro eNodeBs or both can be low power eNodeBs. Embodiments of the invention disclose physical layer mechanisms that enable dual-connectivity from a UE to two or more eNodeBs, where the eNodeBs may control cells operating on one or more carrier frequencies.

Mechanisms

Described below are methods for dual connectivity when the cells controlled by the MeNB and SeNB are deployed on different carrier frequencies. At Layer 2 (L2) of the E-UTRA protocol stack, the logical, transport and physical channels of the Medium Access Control (MAC) layer may be partitioned between cells controlled by MeNB and SeNB. Referring now to FIG. 4 an illustration is shown for an exemplary mapping of C-plane and U-plane functions to a macro cell controlled by MeNB 400 and a small cell controlled by SeNB 420 respectively. MeNB 400 operates on carrier frequency F1 and SeNB 420 operates on a different carrier frequency F2. The multicast channels that support a Multimedia Broadcast Multicast Service (MBMS) 440 can also be assigned a dedicated frequency F3 or can share the same frequency as either the macro or small cell. This mechanism for inter-node radio resource aggregation bears some slight similarity to carrier aggregation. In carrier aggregation, the UE maintains a single Radio Resource Control (RRC) connection to the network on a primary serving cell (PCell) and said UE can be configured for data transmission/reception in one or more secondary serving cells (SCells) each deployed on a different component carrier. Furthermore, the set of serving cells are controlled by the same eNodeB or an eNodeB connected to remote radio heads by an ideal backhaul link. In any case the set of configured serving cells may be considered to be controlled from one eNodeB given the ideal backhaul link. In contrast, inter-node radio resource aggregation, which is characterized by a capacity- and latency-constrained backhaul link, requires that the UE is aware it consumes radio resources from at least two eNodeBs. This difference between carrier aggregation and dual connectivity introduces a need for new methods to enable dual connectivity at Layers 1 and 2 of the RAN protocol stack.

The access mechanism for dual connectivity operation is now described. At initial access or when the UE is in the RRC_IDLE state, the UE connects to a suitable cell based on a set of defined cell selection criteria. Dual connectivity may only be configured when the UE is in the RRC_CONNECTED state. The UE performs inter-frequency cell search to discover suitable small cells, where suitability means a small cell is a candidate for inter-node radio resource aggregation for this UE. Cell discovery is enabled by detection of the primary and secondary synchronization signals and received power measurement on the cell-specific reference signals (CRS). As a complementary technique for small cell discovery in a dense HetNet a specialized discovery signal can be used. The UE reports the set of candidate cells to the network. The EUTRAN selects one or more additional cells for the said UE. If a selected target cell is controlled by the same eNodeB, the EUTRAN may configure the UE for carrier aggregation. Otherwise, if the selected cell is controlled by a different eNodeB, dual connectivity may be configured for the UE. For dual connectivity the serving eNB becomes the MeNB whereas the eNB controlling the target cell is configured as the SeNB. The MeNB controls mobility (handover) functions for a UE configured for dual connection operation. The UE is configured through dedicated radio resource control (RRC) signaling for data transmission to/from a secondary cell, where the cell ID of the secondary cell is contained in the secondary cell configuration. The UE may be configured with a separate Cell Radio Network Temporary Identifier (C-RNTI) for one or more secondary cells controlled by the SeNB. This C-RNTI is allocated by a contention-based random access procedure between the UE and the SeNB. Alternatively, if only non-contention based random access is permitted between the UE and the SeNB, the C-RNTI is provided by RRC signaling at SeNB addition/configuration. The UE may use the C-RNTI associated to the SeNB for all uplink transmissions towards the SeNB. This includes generating scrambling sequences and uplink reference signals based on this C-RNTI.

For dual connectivity the UE is configured to receive PDSCH from both the MeNB and the SeNB. For the case of a split between control and user plane data, common and dedicated RRC signaling, paging, system information notification and Earthquake and Tsunami Warning service (ETWS) may be transmitted on a primary cell controlled by the MeNB. U-plane data is transmitted on the PDSCH of a secondary cell controlled by a SeNB. In a different embodiment the MeNB may also transmit U-plane data to the UE. This approach is useful for robust or fallback operation between macro and small cell layers of a heterogeneous network deployment, where the UE moves between two small cells or between a small cell and macro cell. In a third embodiment both MeNB and SeNB transmit C-plane and U-plane data to the UE. This method can also be useful for dual connectivity between nodes of the same power class.

The downlink transmission including Hybrid Automatic Repeat reQuest (HARQ) procedures is now described. For single cell operation or carrier aggregation, HARQ-ACK feedback in response to a data transmission on the PDSCH of one or more serving cells is transmitted on the PUCCH or on the PUSCH if the UE is also scheduled for UL-SCH data transmission. If two serving eNodeBs are connected by an ideal backhaul link this same mechanism can be followed since the HARQ feedback to a SeNB can be routed through the MeNB within the HARQ-ACK feedback timing budget. However, for a backhaul link with latency greater than the HARQ-ACK feedback timing budget, the UE should be configured to transmit uplink control signaling (UCI) on a separate PUCCH for each serving eNodeB. This concept of separate PUCCH is also beneficial for energy conservation at the UE because if the UE is more frequently scheduled on a cell controlled by a nearby eNodeB the required uplink transmit power is also smaller than that required to transmit to a eNodeB that is further away. Therefore, HARQ acknowledgement (HARQ-ACK) feedback in response to a PDSCH received from the MeNB in a primary cell is transmitted on PUCCH to the MeNB. Correspondingly, HARQ-ACK feedback in response to a PDSCH received from the SeNB in a secondary cell is transmitted on PUCCH to the SeNB. In addition channel state information (CSI) reporting is independently configured for each serving cell. CSI reports for serving cells controlled by the MeNB may be transmitted on PUCCH of a primary cell controlled by the MeNB. CSI reports for serving cells controlled by the SeNB may be transmitted on PUCCH of a secondary cell controlled by the SeNB.

One deployment scenario of dual connectivity can be configuring the UE to transmit or receive data on multiple component carriers for the MeNB and/or the SeNB. This is equivalently a combination of carrier aggregation and dual connectivity. In this case the set of component carriers linked to a serving eNodeB are either collocated or connected by an ideal backhaul link in the case of e.g. remote radio heads. For this scenario one serving cell controlled by the MeNB is the primary cell and is the serving cell where the UE transmits on the PUCCH. One serving cell controlled by the SeNB is configured for PUCCH transmission from the UE to the SeNB.

To ensure robustness for delay-sensitive applications such as voice, Semi-Persistent Scheduling (SPS) can be configured on a primary cell controlled by the MeNB when the MeNB provides the mobility anchor for the UE towards the core network. In a different embodiment the SeNB may also configure a UE for SPS operation.

For independent scheduling of data on radio bearers from MeNB and SeNB respectively, it may be necessary for the UE to independently request uplink resources from any of the serving eNodeBs. Therefore, the UE can be independently configured by either MeNB or SeNB with a PUCCH resource to transmit a scheduling request (SR). This also minimizes the need for signaling between MeNB and SeNB for routing requests for uplink resources. In addition buffer status reports (BSR) can be independently transmitted to each serving eNodeB based on which eNodeB configured the associated radio bearer. As an example, when a buffer status report needs to be transmitted to the SeNB and there is no UL-SCH resource available from the SeNB within a defined latency period, the UE transmits a scheduling request on PUCCH to the SeNB or, if there is no valid PUCCH resource for this purpose, the UE initiates a contention-based random access procedure to the SeNB.

Independent random access procedures may be defined for dual connectivity. Although LTE Release 11 supports random access procedure on a secondary cell for carrier aggregation, it is limited to contention-free random access. For dual connectivity with limited coordination between eNodeBs the UE should be configured with the full PRACH configuration of a secondary serving cell controlled by the SeNB for both contention-free and contention-based random access. For random access on a secondary cell controlled by a SeNB, the entire random access procedure including preamble transmission, random access response, initial uplink transmission corresponding to the random access response grant and contention resolution, if necessary, are performed between the UE and SeNB. Therefore, the UE monitors the common search space of the secondary cell controlled by the SeNB for random access response messages.

Simultaneous uplink transmission to a MeNB and a SeNB in the same transmission time interval (TTI) may be limited by the transmit power capability of a UE. For prior LTE systems a UE may be configured for simultaneous transmission on PUSCH and PUCCH or on multiple PUSCH when configured for PUSCH transmission on multiple component carriers. In case the total required power exceeds the UE maximum power capability, a power scaling procedure is followed where PUSCH power is scaled down as long as UCI is not multiplexed with UL-SCH data on PUSCH. Furthermore, PUCCH power is not scaled down because of the importance of correctly receiving the UCI at the eNodeB. For dual connectivity with independent PUCCH and PUSCH to each serving eNodeB, it is important to define how to prioritize power allocation in case the required power exceeds the maximum power capability. Herein we describe some mechanisms for uplink power control in case the total required power exceeds the UE maximum power.

One uplink power control mechanism is to maintain a higher priority for UCI transmission on PUCCH and/or PUSCH compared to UL-SCH data only. For simultaneous transmission on PUSCH to one serving eNodeB and PUCCH to another eNodeB, the PUCCH power is prioritized, wherein the desired PUCCH power is first allocated and then any residual power may be allocated to PUSCH. For simultaneous transmission of PUCCH to both MeNB and SeNB in the same TTI, the PUCCH power may be equally scaled since both transmissions contain UCI. Other embodiments are possible targeting what kind of UCI is actually transmitted. In one such embodiment, if only CSI is transmitted on one PUCCH and HARQ-ACK-only or HARQ_ACK+CSI is transmitted on the other PUCCH, the UE may prioritize the PUCCH transmission containing HARQ-ACK information. These power control rules may also be applied to other uplink channels in the event of a transmit power limitation at a UE. For instance, it may be desired to prioritize preamble transmission on the PRACH to a serving eNodeB over a PUSCH transmission only containing UL-SCH data to a different serving eNodeB.

Spectrum remains the most expensive resource in wireless networks. As such, it may be desirable to support dual-connectivity for a shared carrier HetNet deployment. FIG. 5 shows an exemplary mapping at Layer 2 of the RAN protocol stack between logical 510, transport 511 and physical 512 channels for MeNB 500 and SeNB 520. Here, U-plane data is transmitted on the secondary cell controlled by SeNB 520 whereas C-plane, and possibly U-plane data, may be transmitted in a cell controlled by MeNB 500. On the physical layer, the PDSCH and the corresponding control channels (PDCCH/EPDCCH) are present for both the MeNB and SeNB. Hence, a method to achieve scheduling of data transmission/reception is required in an orthogonal (interference-coordinated) fashion. Towards this goal the UE shall be configured to monitor for downlink control information (DCI) on the PDCCH and/or EPDCCH of cells controlled by both MeNB and SeNB. Different multiplexing methods can be configured for this purpose.

In one scheme, time domain multiplexing can be configured for dual connectivity to the MeNB and SeNB. Herein, a UE is configured with a set of subframes to monitor DCI (PDCCH/EPDCCH) from the MeNB for scheduling C-plane data and possible U-plane data. The UE is configured with a disjoint set of subframes to monitor DCI (PDCCH/EPDCCH) from the SeNB for scheduling U-plane data.

Multiplexing for DL-SCH data reception may be configured through the choice of downlink control channel. The UE is configured to monitor the PDCCH or EPDCCH for one serving eNB and another EPDCCH for another serving eNB. In an example scenario for a HetNet, the UE is configured to monitor the PDCCH for the macro cell and the EPDCCH for the small cell.

Frequency domain multiplexing of control information may be used for scheduling DL-SCH data. In one embodiment for dual connectivity between macro and small cell layers in a HetNet, the UE is configured to monitor the PDCCH and optionally the EPDCCH on the macro cell. Furthermore, the UE is configured to monitor an independent EPDCCH region(s) using an independent dedicated ID corresponding to the small cell.

Other multiplexing schemes are possible. In one embodiment involving split of control and user plane between MeNB and SeNB the UE is configured to monitor the common search space of the PDCCH for PDSCH transmission from the MeNB and the UE-specific search space of the PDCCH for PDSCH transmission from the SeNB.

The same mechanisms to support random access and uplink control signaling in the separate frequency scenario can also be applied to the shared carrier case. However, other mechanisms tailored to the shared carrier case are also possible.

Figure 6:
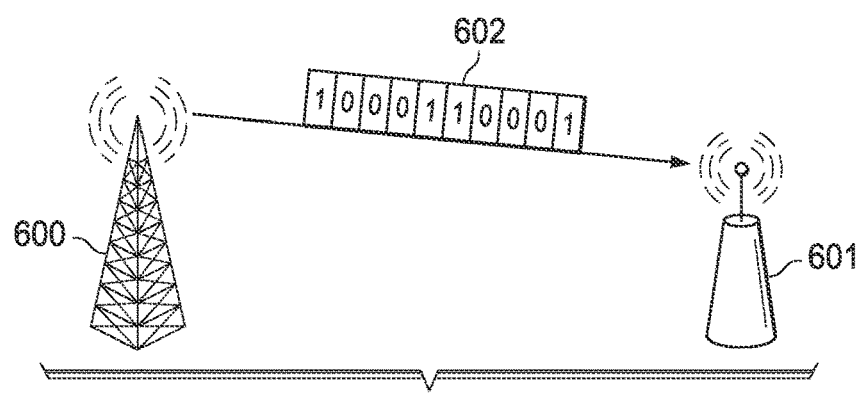
FIG. 6 illustrates signaling of a reserved set of subframes for transmission between Master and Secondary eNBs using a bitmap.

One such mechanism is HARQ-ACK feedback for FDD. In the case of time multiplexing of PDSCH transmission from MeNB and SeNB, there is no collision between HARQ-ACK feedback meant for either serving eNB. As such, HARQ-ACK is transmitted on PUCCH to the serving eNB that transmitted the corresponding PDSCH. For TDD there may be a collision between HARQ-ACK feedback corresponding to PDSCH transmissions from MeNB and SeNB respectively since a single uplink subframe may convey the HARQ-ACK feedback for multiple downlink subframes. In this case, all HARQ-ACK feedback is transmitted to MeNB and the HARQ-ACK feedback meant for the SeNB is routed over the backhaul. If this routing is not possible due to unacceptable backhaul latency, the MeNB may coordinate with the SeNB on which subframes in one or more radio frames it may schedule PDSCH to a UE operating dual connectivity. The SeNB may not schedule PDSCH in these subframes to said UE in order to avoid collision of HARQ-ACK feedback from the UE. A bit value '1' indicates that the MeNB may schedule PDSCH in this subframe whereas a bit value '0' indicates that the MeNB does not intend to schedule PDSCH to the said UE in this subframe. Referring now to FIG. 6, MeNB 600 coordinates scheduling opportunities with SeNB 601 using a bitmap 603 of length 10 bits corresponding to each radio frame. In this illustration in FIG. 6, the MeNB reserves subframes 0, 4, 5 and 9 for its PDSCH transmission. Other values for the length of the bitmap are not precluded. In one embodiment the bitmap length is set to a multiple of a radio frames i.e. a multiple of 10 bits. Furthermore, in another embodiment the bitmap can be set as the least common multiple of the HARQ round trip time and 10 bits (for a radio frame).

Figure 7:
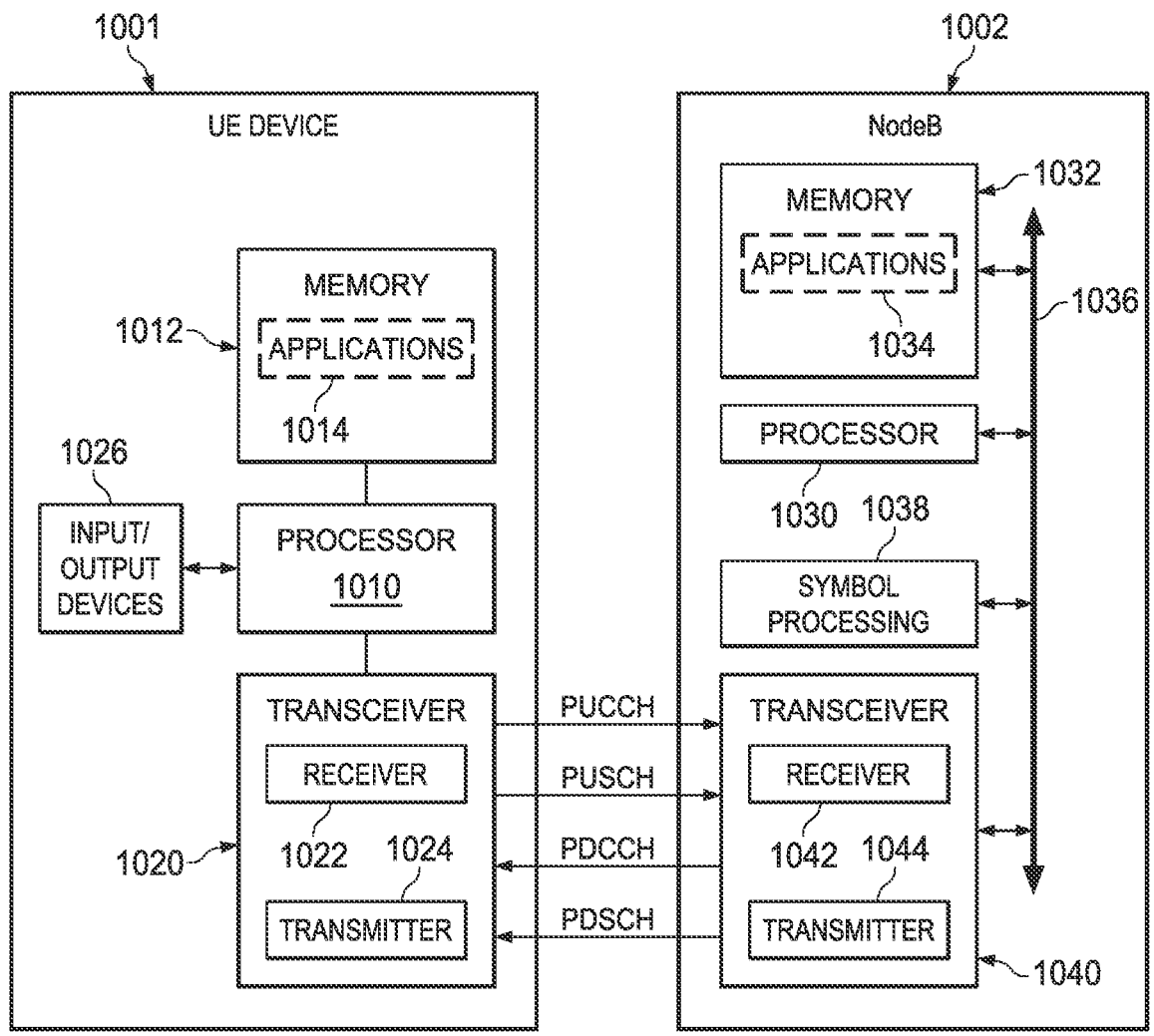
FIG. 7 is a block diagram illustrating internal details of a base station and a mobile user equipment in the network system of FIG. 1 suitable for implementing this invention.

FIG. 7 is a block diagram illustrating internal details of an eNB 1002 and a mobile UE 1001 in the network system of FIG. 1. Mobile UE 1001 may represent any of a variety of devices such as a server, a desktop computer, a laptop computer, a cellular phone, a Personal Digital Assistant (PDA), a smart phone or other electronic devices. In some embodiments, the electronic mobile UE 1001 communicates with eNB 1002 based on a LTE or Evolved Universal Terrestrial Radio Access Network (E-UTRAN) protocol. Alternatively, another communication protocol now known or later developed can be used.

Mobile UE 1001 comprises a processor 1010 coupled to a memory 1012 and a transceiver 1020. The memory 1012 stores (software) applications 1014 for execution by the processor 1010. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 1001 to transmit UL signals to eNB (base-station) 1002 periodically or continuously via the transceiver 1020. In at least some embodiments, the mobile UE 1001 identifies a Quality of Service (QoS) requirement when requesting an uplink resource from eNB 1002. In some cases, the QoS requirement may be implicitly derived by eNB 1002 from the type of traffic supported by the mobile UE 1001. As an example, VOIP and gaming applications often involve low-latency uplink (UL) transmissions while High Throughput (HTP)/Hypertext Transmission Protocol (HTTP) traffic can involve high-latency uplink transmissions.

Transceiver 1020 includes uplink logic which may be implemented by execution of instructions that control the operation of the transceiver. Some of these instructions may be stored in memory 1012 and executed when needed by processor 1010. As would be understood by one of skill in the art, the components of the uplink logic may involve the physical (PHY) layer and/or the Media Access Control (MAC) layer of the transceiver 1020. Transceiver 1020 includes one or more receivers 1022 and one or more transmitters 1024.

Processor 1010 may send or receive data to various input/output devices 1026. A subscriber identity module (SIM) card stores and retrieves information used for making calls via the cellular system. A Bluetooth baseband unit may be provided for wireless connection to a microphone and headset for sending and receiving voice data. Processor 1010 may send information to a display unit for interaction with a user of mobile UE 1001 during a call process. The display may also display pictures received from the network, from a local camera, or from other sources such as a Universal Serial Bus (USB) connector. Processor 1010 may also send a video stream to the display that is received from various sources such as the cellular network via RF transceiver 1020 or the camera.

During transmission and reception of voice data or other application data, transmitter 1024 may be or become non-synchronized with its serving eNB. In this case, it sends a random access signal. As part of this procedure, it determines a preferred size for the next data transmission, referred to as a message, by using a power threshold value provided by the serving eNB, as described in more detail above. In this embodiment, the message preferred size determination is embodied by executing instructions stored in memory 1012 by processor 1010. In other embodiments, the message size determination may be embodied by a separate processor/memory unit, by a hardwired state machine, or by other types of control logic, for example.

eNB 1002 comprises a Processor 1030 coupled to a memory 1032, symbol processing circuitry 1038, and a transceiver 1040 via backplane bus 1036. The memory stores applications 1034 for execution by processor 1030. The applications could comprise any known or future application useful for managing wireless communications. At least some of the applications 1034 may direct eNB 1002 to manage transmissions to or from mobile UE 1001.

Transceiver 1040 comprises an uplink Resource Manager, which enables eNB 1002 to selectively allocate uplink Physical Uplink Shared CHannel (PUSCH) resources to mobile UE 1001. As would be understood by one of skill in the art, the components of the uplink resource manager may involve the physical (PHY) layer and/or the Media Access Control (MAC) layer of the transceiver 1040. Transceiver 1040 includes at least one receiver 1042 for receiving transmissions from various UEs within range of eNB 1002 and at least one transmitter 1044 for transmitting data and control information to the various UEs within range of eNB 1002.

The uplink resource manager executes instructions that control the operation of transceiver 1040. Some of these instructions may be located in memory 1032 and executed when needed on processor 1030. The resource manager controls the transmission resources allocated to each UE 1001 served by eNB 1002 and broadcasts control information via the PDCCH.

Symbol processing circuitry 1038 performs demodulation using known techniques. Random access signals are demodulated in symbol processing circuitry 1038.

During transmission and reception of voice data or other application data, receiver 1042 may receive a random access signal from a UE 1001. The random access signal is encoded to request a message size that is preferred by UE 1001. UE 1001 determines the preferred message size by using a message threshold provided by eNB 1002. In this embodiment, the message threshold calculation is embodied by executing instructions stored in memory 1032 by processor 1030. In other embodiments, the threshold calculation may be embodied by a separate processor/memory unit, by a hardwired state machine, or by other types of control logic, for example. Alternatively, in some networks the message threshold is a fixed value that may be stored in memory 1032, for example. In response to receiving the message size request, eNB 1002 schedules an appropriate set of resources and notifies UE 1001 with a resource grant.

OTHER EMBODIMENTS

While the invention has been described with reference to illustrative embodiments, this description is not intended to be construed in a limiting sense. Various other embodiments of the invention will be apparent to persons skilled in the art upon reference to this description.

Embodiments of this invention apply to various types of frequency division multiplex based transmission. Thus, the concept can easily be applied to: OFDMA, OFDM, DFT-spread OFDM, DFT-spread OFDMA, SC-OFDM, SC-OFDMA, MC-CDMA, and all other FDM-based transmission strategies.

A NodeB is generally a fixed station and may also be called a base transceiver system (BTS), an access point, or some other terminology. A UE, also commonly referred to as terminal or mobile station, may be fixed or mobile and may be a wireless device, a cellular phone, a personal digital assistant (PDA), a wireless modem card, and so on.

As described in general above, embodiment of the invention may perform all tasks described herein such as channel monitoring and precoding selection, formation of transmission signals, etc, using logic implemented by instructions executed on a processor. Another embodiment may have particular hardwired circuitry or other special purpose logic optimized for performing one or more to the tasks described herein.

An embodiment of the invention may include a system with a processor coupled to a computer readable medium in which a software program is stored that contains instructions that when executed by the processor perform the functions of modules and circuits described herein. The computer readable medium may be memory storage such as dynamic random access memory (DRAM), static RAM (SRAM), read only memory (ROM), Programmable ROM (PROM), erasable PROM (EPROM) or other similar types of memory. The computer readable media may also be in the form of magnetic, optical, semiconductor or other types of discs or other portable memory devices that can be used to distribute the software for downloading to a system for execution by a processor. The computer readable media may also be in the form of magnetic, optical, semiconductor or other types of disc unit coupled to a system that can store the software for downloading or for direct execution by a processor.

As used herein, the terms "applied," "coupled," "connected," and "connection" mean electrically connected, including where additional elements may be in the electrical connection path. "Associated" means a controlling relationship, such as a memory resource that is controlled by an associated port.

It is therefore contemplated that the appended claims will cover any such modifications of the embodiments as fall within the true scope and spirit of the invention.

What is claimed is:

1. A method, comprising:
    configuring a user equipment (UE) in a cellular network for reception of waveforms from, or transmission of waveforms to, more than one base station (eNB) in the cellular network transmitting in overlapping or non-overlapping wireless spectrum; and
    designating one of the more than one base station for transmission/reception of common and dedicated radio resource control (RRC) and non-access stratum (NAS) signaling, wherein a full physical random access channel (PRACH) configuration includes a set of contention based PRACH signatures configured for each base station (eNB) of the cellular network to enable a complete random access procedure including preamble transmission, random access response, initial uplink transmission corresponding to a random access response grant and contention resolution for a cell.

2. The method of claim 1, further comprising designating said one of the more than one base station as a mobility anchor to a core network.

3. The method of claim 2, wherein the UE initializes a random sequence generator as a function of a Cell Radio Network Temporary Identifier (C-RNTI) associated with the base station from which it received a scheduling grant for respective transmission.

4. The method of claim 1, wherein the UE is configured with two or more separate Cell Radio Network Temporary Identifiers (C-RNTI) for transmitting or receiving from each of the more than one base station.

5. The method of claim 1, wherein a first base station designated for transmission/reception of common and dedicated radio resource control (RRC) and non-access stratum (NAS) signaling configures at least one secondary base station of the cellular network, to which the first base station is connected via a backhaul communications link, for transmission/reception to/from the UE configured for reception or transmission of waveforms from or to a plurality of base stations (eNB) of the cellular network.

6. The method of claim 5, wherein the UE initializes a random sequence generator as a function of a Cell Radio Network Temporary Identifier (C-RNTI) associated with the base station from which it received a scheduling grant for respective transmission.

7. The method of claim 1, wherein the UE transmits data to the base station from which it received a scheduling grant for respective transmission.

8. The method of claim 1, wherein the UE is configured to transmit uplink control signaling on separate physical uplink control channels to a plurality of base stations (eNB) of the cellular network.

9. The method of claim 8, wherein the UE transmits Hybrid Automatic Repeat reQuest acknowledgement (HARQ-ACK) feedback to the base station (eNB) of the cellular network from which a corresponding downlink data transmission was received or control information indicating release of a semi-persistent scheduling process.

10. The method of claim 8, wherein the UE transmits channel state information (CSI) feedback for a cell on a physical uplink control channel (PUCCH) of one of serving cells controlled by the base station requesting CSI.

11. The method of claim 8, wherein resources for a physical uplink control channel for a scheduling request (SR) are independently configured for the plurality of base stations (eNB) of the cellular network.

12. The method of claim 8, wherein the UE:
when a buffer status report (BSR) needs to be transmitted for a respective base station (eNB) of the cellular network;
and if there is no Uplink Shared Channel (UL-SCH) resource available for that respective base station (eNB) of the cellular network over a defined maximum time period;
and if the UE is not configured with a valid PUCCH resource in any transmission time interval (TTI);
initiates a random access response to that respective base station (eNB) of the cellular network;
or otherwise transmits a scheduling request (SR) on PUCCH of the respective base station (eNB) of the cellular network according to an SR transmission procedure.

13. The method of claim 12, wherein the UE initiates a random access process or otherwise transmits a scheduling request (SR) on PUCCH to a designated base station (eNB) of the cellular network.

14. The method of claim 8, wherein a single resource for a physical uplink control channel for a scheduling request (SR) is configured for the plurality of base stations (eNB).

15. The method of claim 1, wherein the random access response is scheduled on a common search space of a cell.

* * * * *